(12) United States Patent
Horowitz et al.

(10) Patent No.: US 11,478,070 B1
(45) Date of Patent: Oct. 25, 2022

(54) FOLDING TABLE WITH PULL-OUT WHEELS AND REMOVABLE LEAF

(71) Applicants: Brian Horowitz, Lake Forest, CA (US); Jinglei Jiang, Yuyao (CN)

(72) Inventors: Brian Horowitz, Lake Forest, CA (US); Jinglei Jiang, Yuyao (CN)

( * ) Notice: Subject to any disclaimer, the term of this patent is extended or adjusted under 35 U.S.C. 154(b) by 0 days.

(21) Appl. No.: 17/676,020

(22) Filed: Feb. 18, 2022

(51) Int. Cl.
| | | |
|---|---|---|
| *A47B 3/00* | (2006.01) | |
| *A47B 3/08* | (2006.01) | |
| *A47B 13/08* | (2006.01) | |
| *B62B 1/12* | (2006.01) | |

(52) U.S. Cl.
CPC ............ *A47B 3/002* (2013.01); *A47B 3/0803* (2013.01); *A47B 13/081* (2013.01); *B62B 1/12* (2013.01); *B62B 2205/12* (2013.01)

(58) Field of Classification Search
CPC ......... A47B 3/002; A47B 3/00; A47B 13/081; B62B 1/12; B62B 2205/12
USPC ................................ 108/83, 84, 86, 171, 167
See application file for complete search history.

(56) References Cited

U.S. PATENT DOCUMENTS

| | | | | |
|---|---|---|---|---|
| 1,063,642 | A * | 6/1913 | Birdsall ................. | A47B 3/083 5/310 |
| 2,631,075 | A * | 3/1953 | De Gaal Abris ........ | A47B 1/08 108/86 |
| 4,553,485 | A * | 11/1985 | Lee .......................... | A47B 1/08 108/86 |
| 4,794,869 | A * | 1/1989 | Chiu ........................ | A47B 1/02 108/86 |
| 5,201,536 | A * | 4/1993 | Bono ....................... | B62B 1/12 280/30 |
| 5,356,197 | A * | 10/1994 | Simic ..................... | A47C 13/00 280/204 |
| 5,806,437 | A * | 9/1998 | Huang ..................... | A47B 1/02 108/86 |
| 5,927,212 | A * | 7/1999 | Huang ..................... | A47B 1/02 108/86 |
| 6,038,985 | A * | 3/2000 | Chang ..................... | A47B 1/02 108/86 |
| 6,845,991 | B1 * | 1/2005 | Ritucci ................... | B62B 3/007 280/30 |
| 7,574,964 | B2 * | 8/2009 | Farber .................... | A47B 3/087 108/115 |

(Continued)

FOREIGN PATENT DOCUMENTS

DE 202015003174 U1 * 8/2015 ............. A47B 3/083

*Primary Examiner* — Jose V Chen
(74) *Attorney, Agent, or Firm* — Morland C. Fischer

(57) ABSTRACT

Disclosed is a folding table having a pair of frame ends that are pivotally connected together and first and opposite table top surfaces that are mounted on respective ones of the frame ends to be rotatable between a folded configuration at which the first and opposite table top surfaces lie face-to-face and an unfolded configuration at which the table top surfaces lie end-to-end. The folding table has a pair of pull-out wheels that are rotated between an inside position lying underneath the table top surfaces in the folded configuration and an outside position lying outside the table top surfaces in the unfolded configuration. The folding table also has a removable leaf pivotally connected to and rotatable around a pivot bar between a stowed position lying below one of the table top surfaces and a deployed position lying in end-to-end alignment with and between the table top surfaces to increase the length of the table.

25 Claims, 16 Drawing Sheets

(56) References Cited

U.S. PATENT DOCUMENTS

| | | | |
|---|---|---|---|
| 8,209,802 B2 * | 7/2012 | Linares | A61G 1/0212 |
| | | | 108/132 |
| 9,738,295 B1 | 8/2017 | Horowitz | |
| 10,030,447 B2 * | 7/2018 | Pyros | E04G 1/18 |
| D844,353 S * | 4/2019 | Horowitz | D6/687 |
| 10,507,152 B2 * | 12/2019 | Afshani | A61H 3/04 |
| 2003/0192459 A1 * | 10/2003 | Annas | A47B 1/03 |
| | | | 108/86 |
| 2007/0012226 A1 * | 1/2007 | Chen | A47B 1/03 |
| | | | 108/86 |
| 2015/0245716 A1 * | 9/2015 | Hwang | A47C 1/023 |
| | | | 297/284.3 |

* cited by examiner

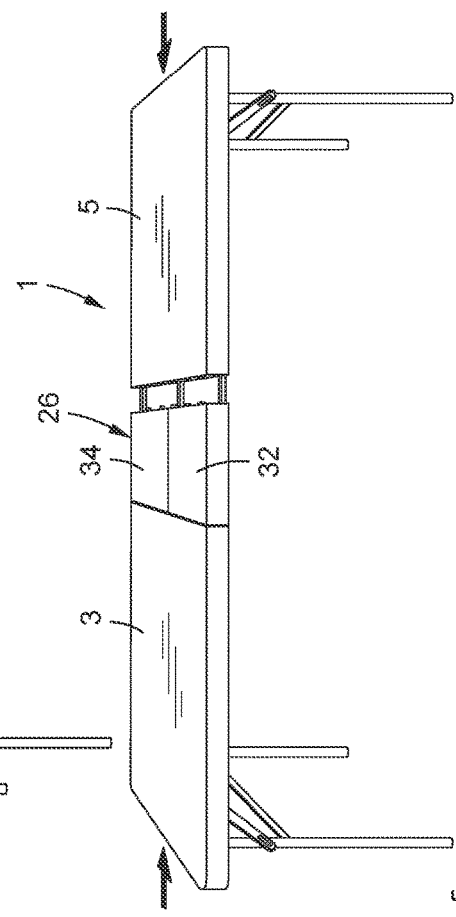
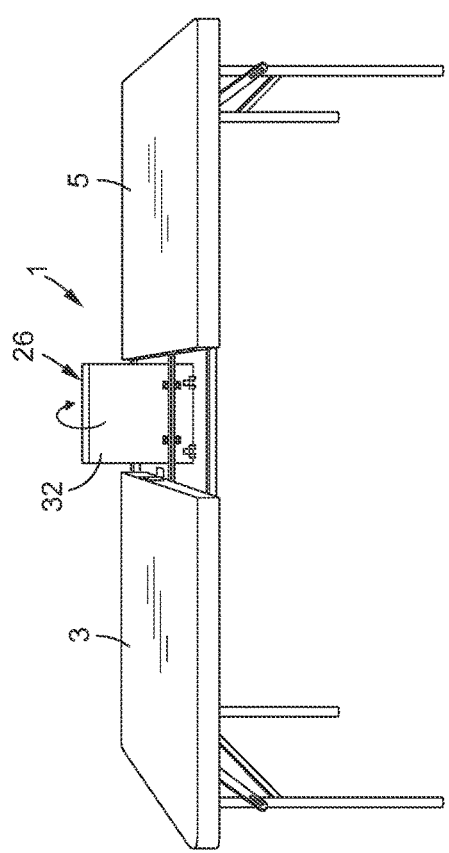
FIG. 9A
FIG. 9B
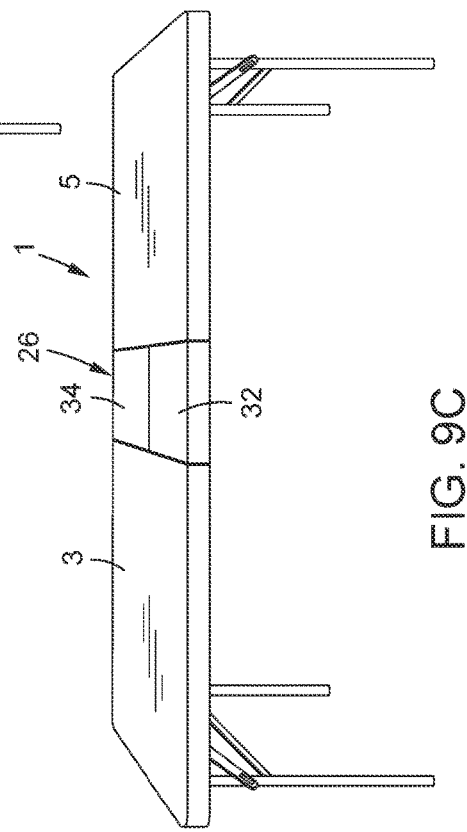
FIG. 9C

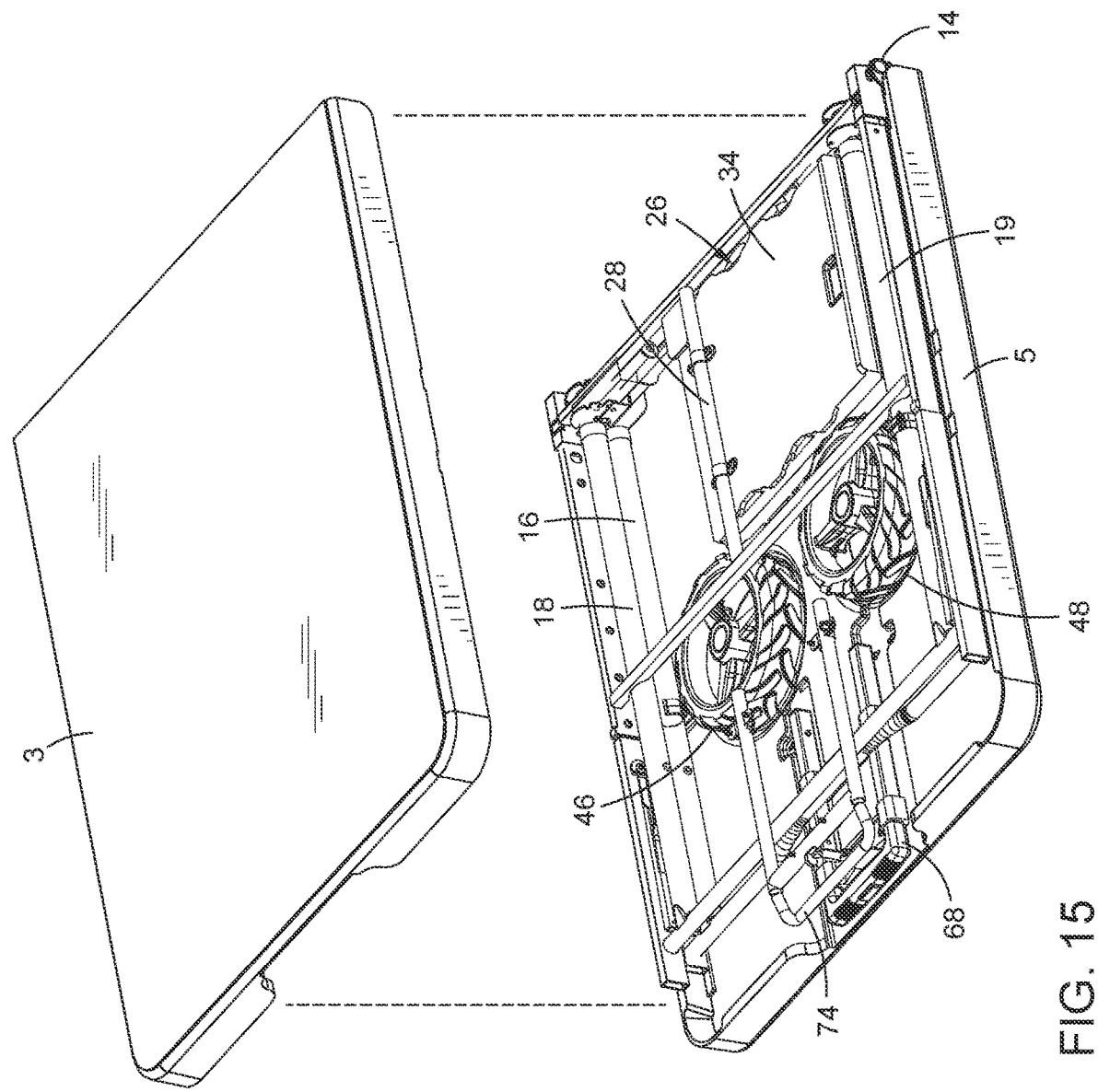

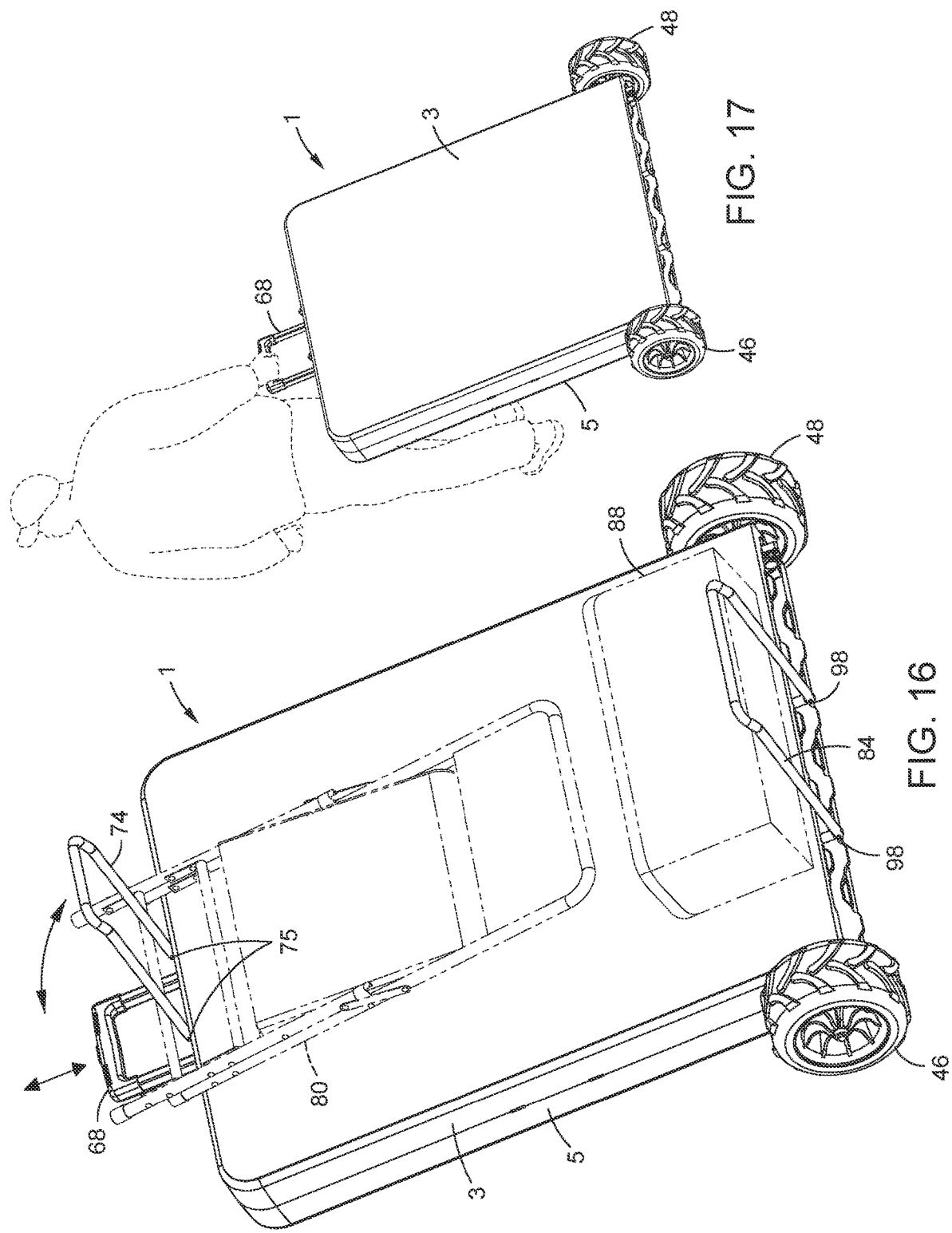

FOLDING TABLE WITH PULL-OUT WHEELS AND REMOVABLE LEAF

BACKGROUND OF THE INVENTION

1. Field of the Invention

This invention relates to a folding table having first and opposite table top surfaces that are rotatable between compact folded and unfolded extended configurations. The folding table also has a pair of pull-out wheels pivotally connected to the bottom of the table so as to be rotatable between an inside position lying underneath the table when the table is unfolded for use and an outside position lying outside the table when the table is folded for transport. The folding table includes a removable leaf that is pivotally connected to a pivot bar of the table frame so as to be rotatable around the pivot bar between a folded stowed position at which to be located out of the way below one of the table top surfaces when the table is folded and an outstretched deployed position at which to lie between the first and opposite table top surfaces to extend the length of the table when the table is unfolded.

2. Background Art

Reference may be made to U.S. Pat. No. 9,738,295 issued Aug. 22, 2017 wherein there is shown and described a folding table having first and opposite ends that are pivotally connected together. The patented folding table has an unfolded extended configuration when the opposing table ends are aligned end-to-end so that the table can be used, for example, at an outdoor event such as a picnic. The patented folding table also has a compact folded configuration when the table ends are rotated towards one another so as to lie face-to-face by which to be conveniently stored when the table is not in use or intended to be transported in a motor vehicle. The aforementioned table also includes a pair of non-obtrusive wheels that can be pulled outwardly and rotated from a first position lying underneath the table when the table is in its unfolded extended configuration to a second position lying outside and adjacent the opposite sides of the table when the table is in its compact folded configuration so that the table can be easily rolled from place-to-place by a single user.

When it is to be used in its unfolded extended configuration, there is no way to extend the length of the patented folding table so as to be able to accommodate a large number of individuals who are in need of being comfortably seated. That is, the lengths of the first and opposite ends of the table in their extended end-to-end alignment cannot be increased such that the overall length of the table is constant. What would therefore be desirable is a means to be conveniently stored by and carried with the folding table so as to be easily deployed when necessary to lie between the first and opposite table ends and thereby increase the overall length of the table in its unfolded extended configuration.

SUMMARY OF THE INVENTION

In general terms, a folding table is disclosed having first and opposite ends that are rotatable around pivots of a table frame between an unfolded extended configuration at which the opposing table ends lie end-to-end to enable the table to be used and a compact folded configuration at which the opposing table ends lie face-to-face one another at which the table can be either stored or transported in a motor vehicle. A pair of pull-out wheels are rotatable at pivotable wheel braces from a first position lying underneath the table to a second position lying outside and adjacent opposite sides of the table at which to enable the table in its folded configuration to be easily rolled from place-to-place by a single individual. When the table is to be rotated to its folded configuration, the wheels can first be removed from their wheel braces and then stored in wheel pockets formed in the bottom of the table to give the table a streamlined profile to facilitate the shipment thereof in a compact container.

A retractable table transport handle is pulled outwardly from the outside of a first end of the table in its folded configuration to which the individual can apply a pulling force to cause the table to roll on its wheels. A retractable chair rack is pulled outwardly from the outside of the opposite end of the table in its folded configuration to engage a stack of folding chairs and thereby enable the chairs to be transported while lying flat against the opposite table end. A retractable cooler transport rack is pulled outwardly from the inside of the first end of the table in its folded configuration to provide a stand on which a conventional cooler is seated and transported. A paper towel holder by which to carry a roll of paper towels is connected to one leg of a plurality of legs which hold the table upright above the ground in its unfolded configuration.

To enable the length of the folding table to be extended to accommodate additional seated individuals, a removable leaf is attached to and carried by the table. The first and opposite ends of the table in its unfolded extended configuration are movable towards and away from one another along side rails of a frame of the table. The removable leaf has first and opposite sides that are pivotally connected to one another at a spine, and the spine is pivotally connected to and rotatable around a pivot bar that is affixed to the table frame. The removable leaf is rotatable at its spine between a folded stowed position at which the opposing sides thereof are located one above the other and an outstretched deployed position at which the sides are aligned side-by-side one another.

When the length of the folding table need not be increased, the opposite ends of the table are first pulled away from one another. The removable leaf is folded and rotated downwardly around and below the pivot bar to its stowed position. The opposite table ends are then pushed together such that the leaf lies underneath a first end of the table. A table lock is located below the first table end to lock the opposite table ends end-to-end one another. When the length of the table is to be increased, the table lock is unlocked and the opposite ends of the table are once again pulled away from one another. The removable leaf is now accessible to be rotated upwardly around and above the pivot bar where the leaf is rotated at its spine to the outstretched deployed position. The opposite ends of the table are once again pushed together such that the leaf lays on top of the pivot bar. The opposing sides of the leaf extend laterally across the table between the opposite table ends.

BRIEF DESCRIPTION OF THE DRAWINGS

FIG. 2A is an enlarged detail taken from FIG. 2 showing a bracket to provide support for the removable leaf in the folded stowed position;

FIG. 9A illustrates the removable leaf being rotated from the outstretched deployed position to the folded stowed position below the folding table;

FIG. 9B illustrates the first and opposite table top surfaces being moved towards one another after the removable leaf has been rotated to the outstretched deployed position by which to extend the length of the table;

FIG. 9C illustrates the first and opposite table top surfaces pushed together with the removable leaf lying therebetween in the outstretched deployed position;

FIG. 15 shows the pair of pull-out wheels after being detached from the folding table and stored within respective wheel pockets formed in the bottom of the first table top surface;

FIG. 16 shows the folding table after being rotated to a compact folded configuration with a table transport handle, a chair rack, and a cooler transport rack pulled outwardly from the first and opposite table top surfaces and the pair of pull-out wheels rotated outside the table so that the table can be rolled from place-to-place on the wheels;

FIG. 17 shows the folding table in the compact folded configuration and being moved from one place to another by rolling on its pair of wheels in response to a pulling force applied to the table transport handle thereof.

DESCRIPTION OF THE PREFERRED EMBODIMENT

Figure 1:
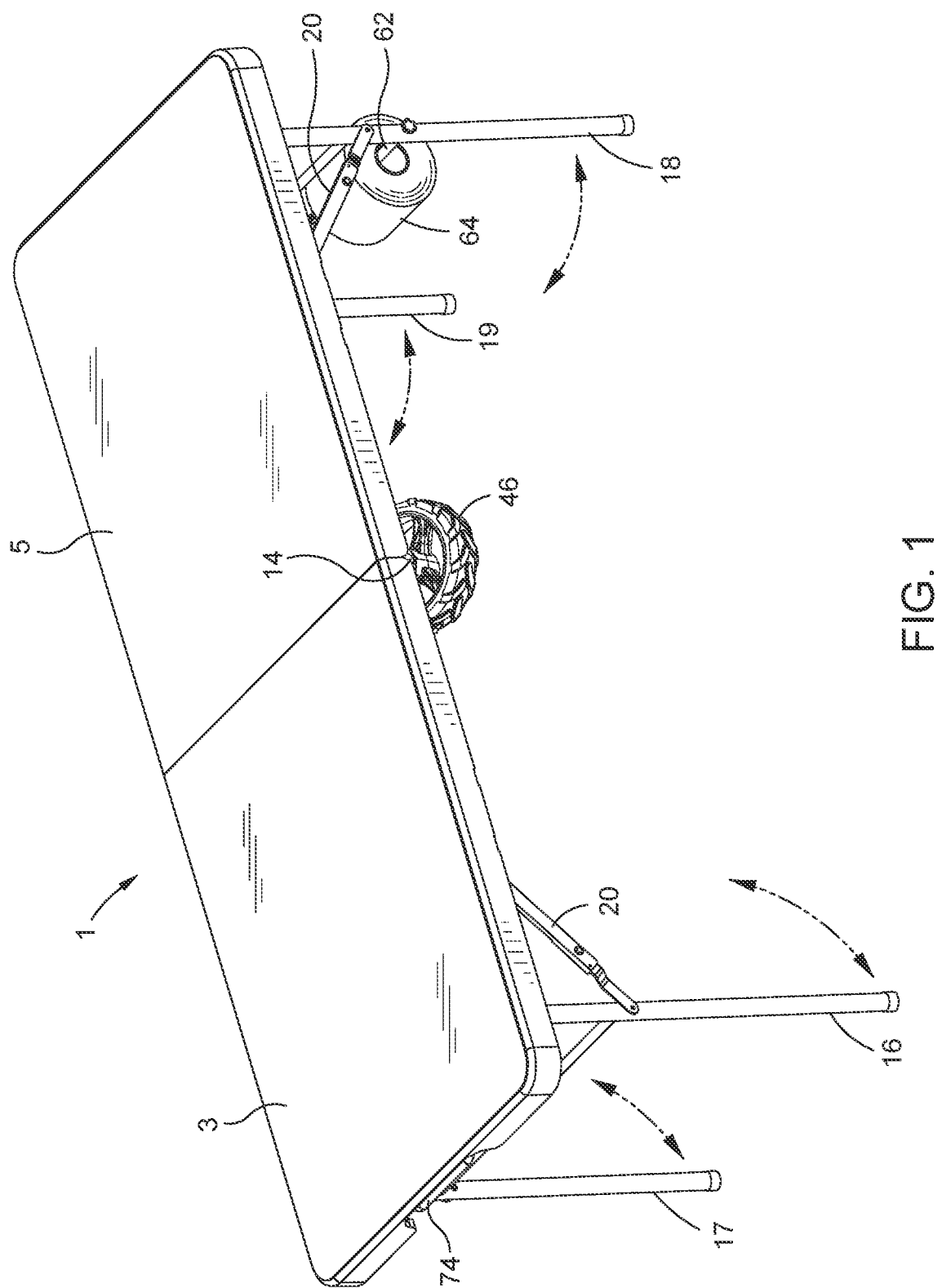
FIG. 1 shows a folding table in an unfolded extended configuration having a pair of pull-out wheels located below the table and first and opposite table top surfaces of the folding table lying end-to-end one another.

A folding table 1 having a removable leaf and a pair of pull-out wheels is now described while referring to the drawings. FIGS. 1-10 show the folding table 1 having first and opposite table top surfaces 3 and 5 lying at first and opposite ends thereof and mounted upon a frame 7 at first and second pairs of side rails 8, 9 and 10, 11. The opposing table top surfaces 3 and 5 are manufactured, for example, from blow molded plastic. A pair of intermediate side rails 12 and 13 (best shown in FIGS. 4 and 5) are located between the pairs of side rails 8, 9 and 10, 11 at opposite sides of the frame 7.

First and second pivots 14 and 15 are located at opposite sides of the table frame 7. The table 1 is adapted to be rotated at its frame 7 around the pivots 14 and 15 between an unfolded extended configuration at which the table top surfaces 3 and 5 that are mounted on the side rails 8-11 of the frame 7 are aligned end-to-end one another (best shown in FIG. 1) and a compact folded configuration where the table top surfaces 3 and 5 are aligned face-to-face one another (best shown in FIG. 16).

A first pair of legs 16 and 17 of the table 1 are pivotally connected to one end of the frame 7 at respective ones of the side rails 8 and 9. A second pair of legs 18 and 19 are pivotally connected to the opposite end of the frame 7 at respective ones of the side rails 10 and 11. A folding bracket 20 is pivotally connected between each leg and each of the side rails. The folding brackets 20 are rotated between an expanded position by which the first and second pairs of legs 16-19 hold the table upright when the table is in its unfolded extended configuration as shown in FIG. 1 and a collapsed position by which the legs 16-19 are rotated to lie under the frame 7 when the table is in its compact folded configuration.

Figure 4:
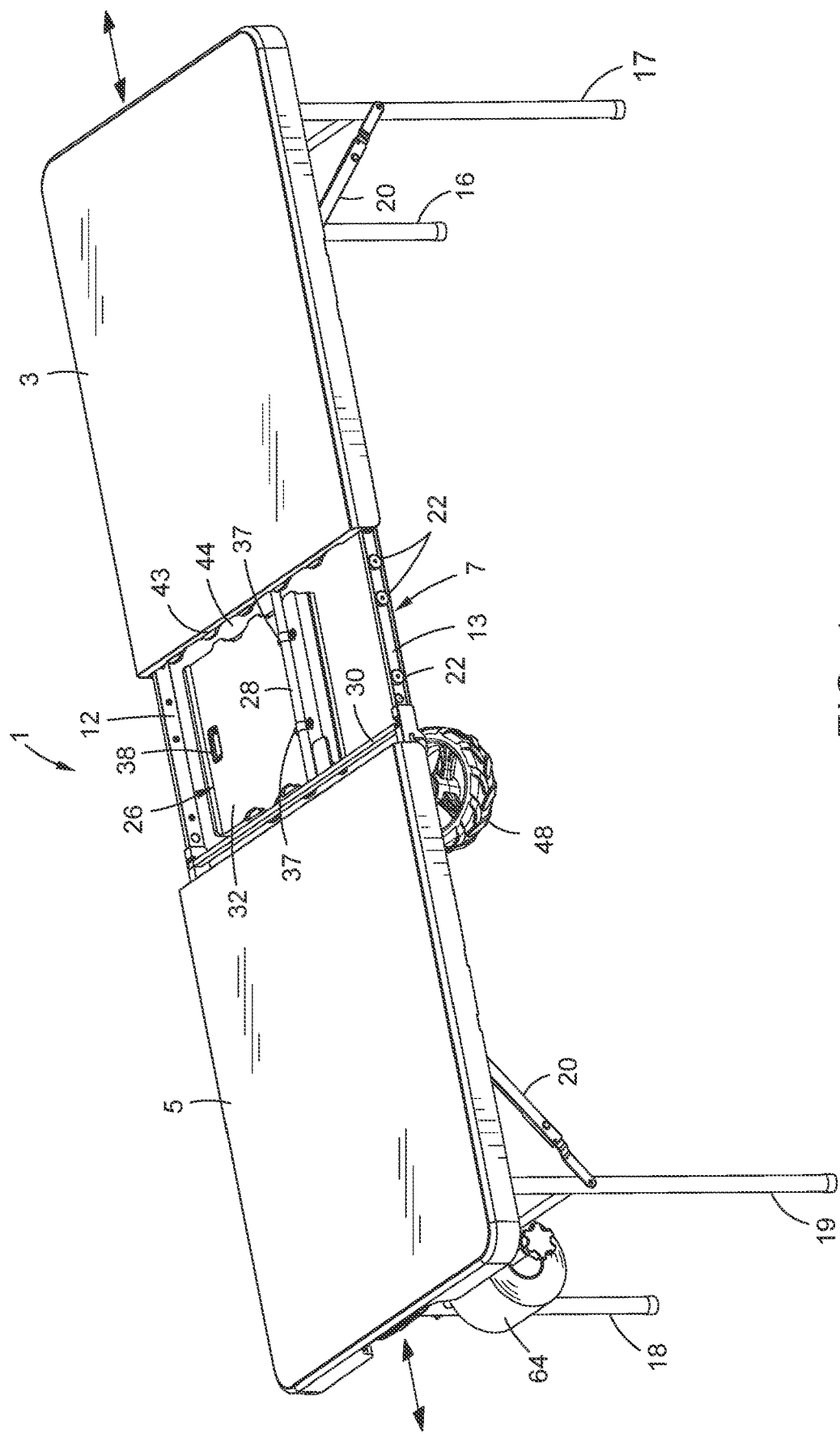
FIG. 4 shows the top of the assembled folding table with the first and opposite table top surfaces moved in opposite directions along side rails of the rotatable frame and the removable leaf pivotally attached to a pivot bar of the frame and rotated to the folded stowed position.
Figure 5:
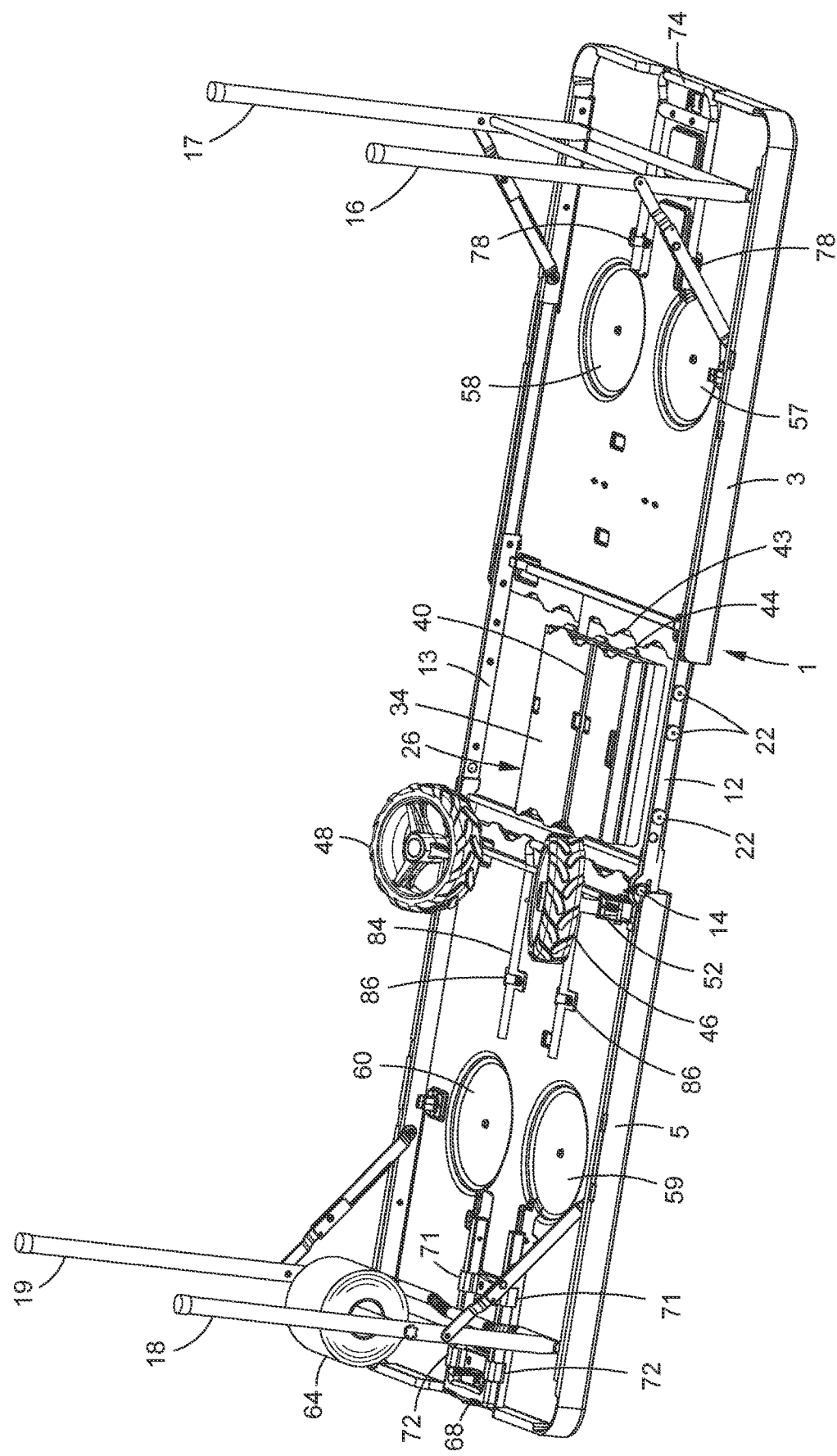
FIG. 5 shows the bottom of the folding table of FIG. 4 after the first and opposite table top surfaces have been moved in opposite directions along the side rails of the rotatable frame and the removable leaf has been rotated underneath the table to the folded stowed position.

As is best illustrated in FIGS. 4 and 5 of the drawings, the opposing table top surfaces 3 and 5 are slidable back and forth, towards and away from one another when it is desirable to increase or shorten the length of the folding table 1. In this regard, the table top surfaces 3 and 5 are slidable along the first and second pairs of side rails 8, 9 and 10, 11 of the table frame 7. A set of rollers 22 are mounted on each of the intermediate side rails 12 and 13 in order to facilitate the ability of the table top surfaces 3 and 5 to slide in opposite directions relative to one another.

Figure 3:
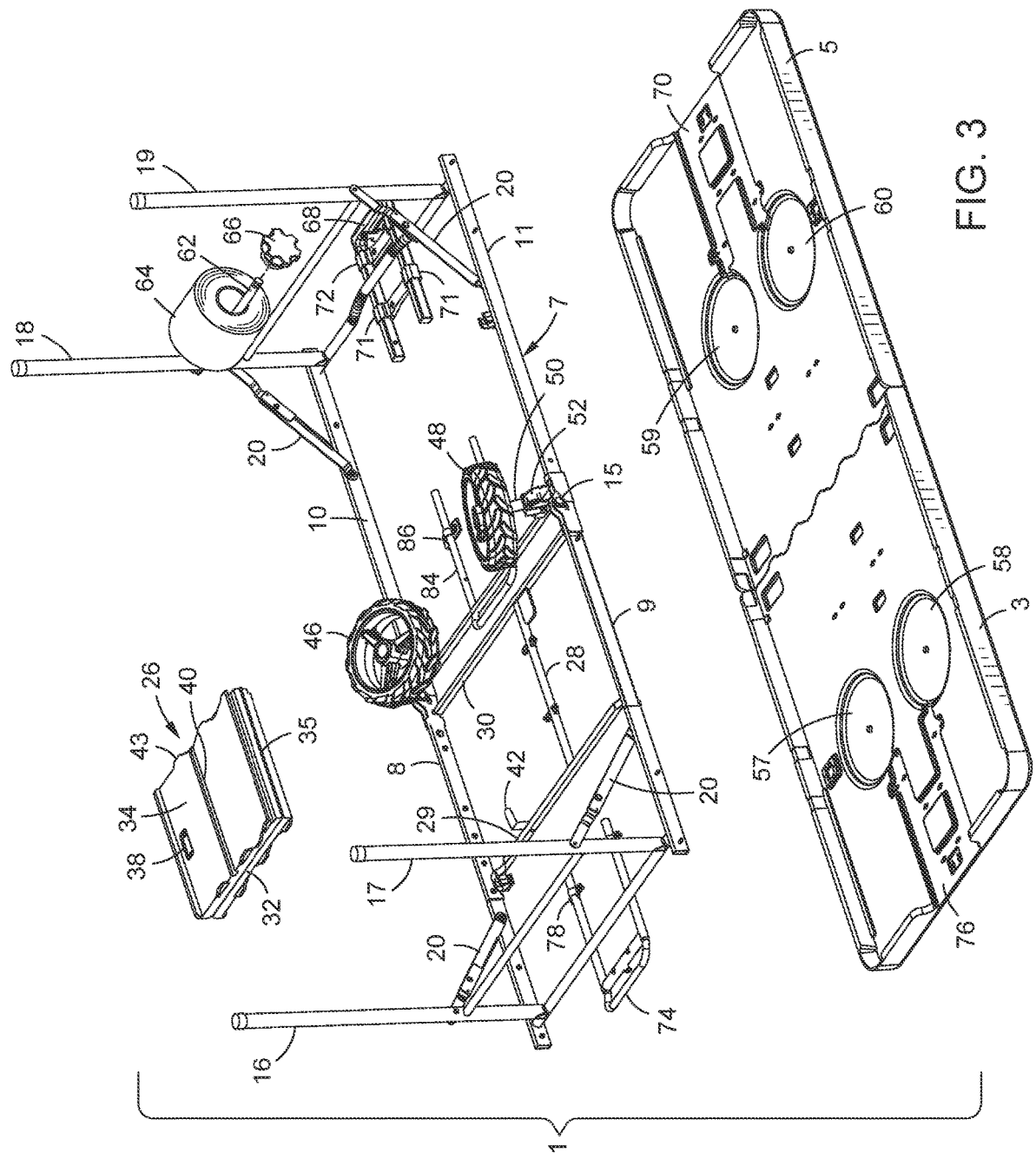
FIG. 3 is an exploded view showing the bottom of the rotatable frame of the folding table with the first and opposite table top surfaces and the removable leaf separated therefrom.

When it is desirable to increase the length of the table, the opposing table top surfaces 3 and 5 are pulled away from one another by which to provide an individual with ready access to a removable leaf 26. As is best shown in FIG. 3, the removable leaf 26 has first and second sides 32 and 34 that are pivotally connected to one another at a flexible spine 35. As is best shown in FIG. 4, the removable leaf 26 is pivotally connected to a pivot bar 28 by means of a pair of clips 37. The pivot bar 28 extends axially along the table frame 7 between a pair of pivot bar support rails 29 and 30 that are connected between the side rails 8 and 9 below the table top surface 3.

Figure 6:
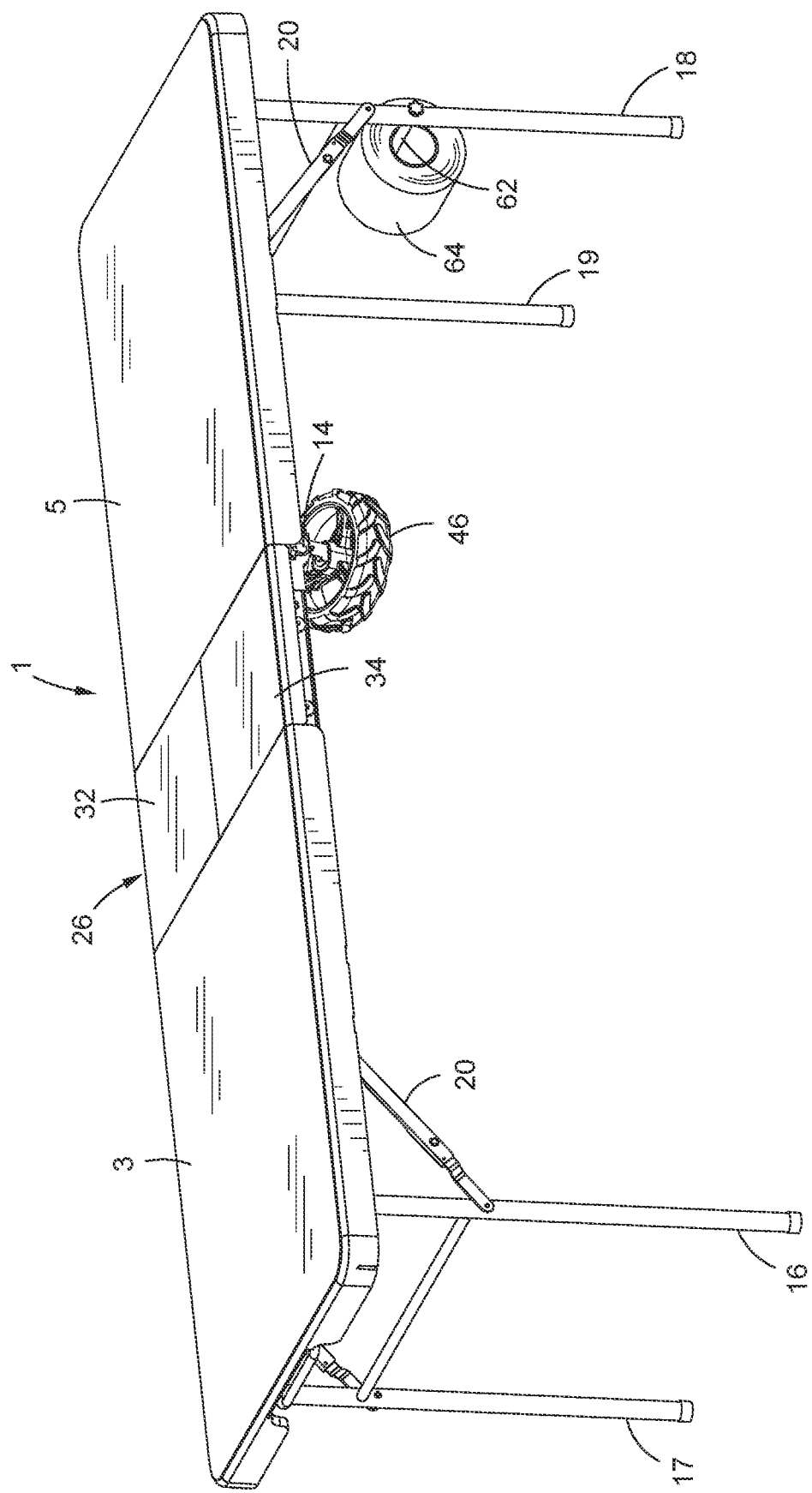
FIG. 6 shows the top of the folding table with the removable leaf rotated to an outstretched deployed position extending laterally across the table and lying between the first and opposite table top surfaces.
Figure 8:
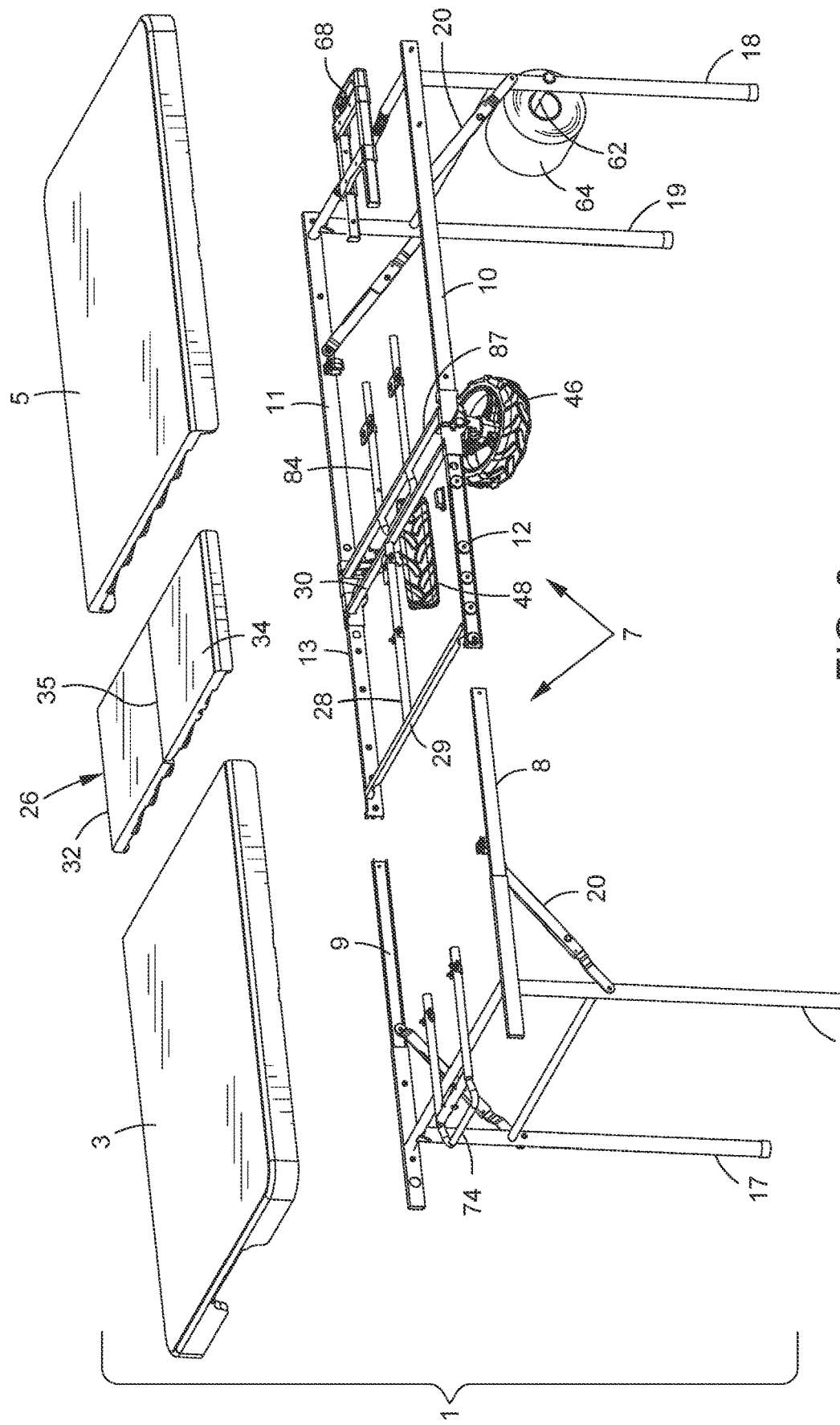
FIG. 8 is an exploded top view of the folding table with the first and opposite table top surfaces and the rotatable leaf separated from one another and from the table frame.

The removable leaf 26 is rotatable at its spine 35 around the pivot bar 28 between a folded stowed position at which the first and second sides 32 and 34 of the leaf are located one above the other (best shown in FIGS. 2 and 4) and an outstretched deployed position at which the first and second sides 32 and 34 are opened and aligned side-by-side one another (best shown in FIGS. 6 and 8). A magnet 38 (best shown in FIGS. 2 and 3) is embedded in each of the first and second sides 32 and 34 to hold the sides one above the other when the leaf 26 is rotated to the folded position. A leg channel 40 (best shown in FIGS. 3 and 5) is formed in the second (i.e., the lowermost) side 34 of the leaf 26 in which to receive one leg of a soon to be described cooler transport rack 84 (of FIGS. 3 and 5) when the leaf is in the folded position and the table is rotated to its folded configuration.

Figure 2:
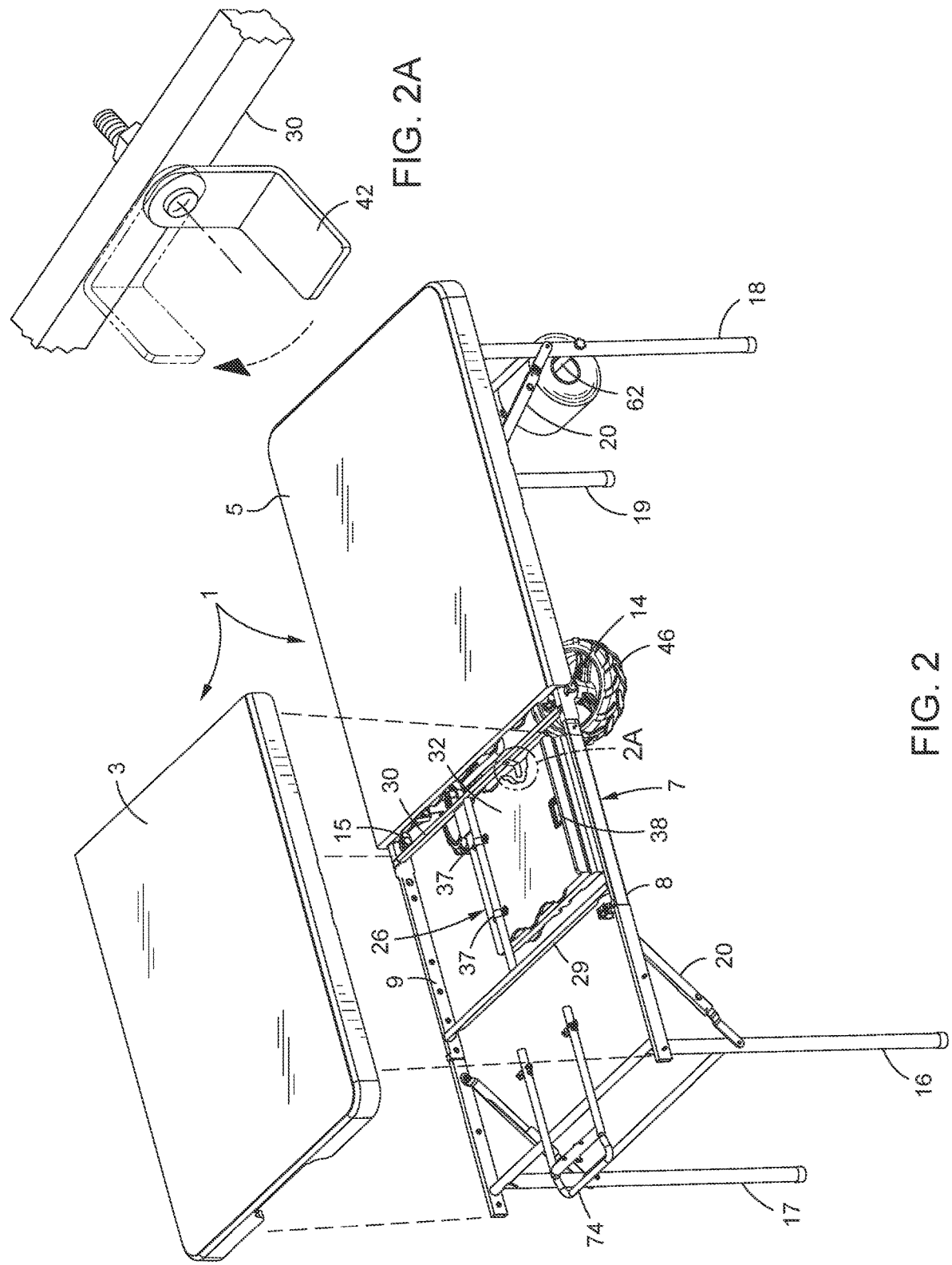
FIG. 2 shows one end of a rotatable frame of the folding table of FIG. 1 on which the first and opposite table top surfaces are seated and from which the first table top surface is removed to permit access to a removable leaf in a folded stowed position.

When the length of the folding table 1 need not be increased, the table top surfaces 3 and 5 are first pulled apart to slide in opposite directions along the pairs of side rails 8, 9 and 10, 11. After being rotated at its spine 35 to the folded stowed position, the removable leaf 26 is rotated downwardly around and below the pivot bar 28 in the manner shown in FIG. 9A. The opposing table top surfaces 3 and 5 are now pushed towards one another and together with the removable leaf 26 being suspended at and hanging downwardly from the pivot bar 28 by the clips 37. Accordingly, the folded leaf 26 is removed to an out of the way location below the table top surface 3. As is best shown in FIG. 2B, a rotatable L-shaped bracket 42 is pivotally coupled to one of the pivot bar supports 30 at which to be rotated downwardly to provide support for the removable leaf in the stowed folded position of FIG. 2.

When it is desirable to increase the length of the folding table, the first and opposite table top surfaces 3 and 5 below which the removable leaf 26 is located in its folded stowed position are once again pulled apart and away from one another. The removable leaf 26 is now accessible so as to be rotated upwardly around and above the pivot bar 28. The removable leaf 26 is then rotated at its spine 35 from the folded position at which the first and second sides 32 and 34 of the leaf lay one on top of the other to the deployed position at which the sides are outstretched in side-by-side alignment so as to extend laterally across the table. The removable leaf 26 in its deployed position lays flat on top of the pivot bar 28. The first and opposite table top surfaces 3 and 5 are once again pushed towards one another and together in the manner shown in FIG. 9B. Accordingly, the removable leaf 26 in its outstretched deployed position is now located in end-to-end alignment with and between the opposing table top surfaces 3 and 5 in the manner shown in FIGS. 6 and 9C.

Figure 7:
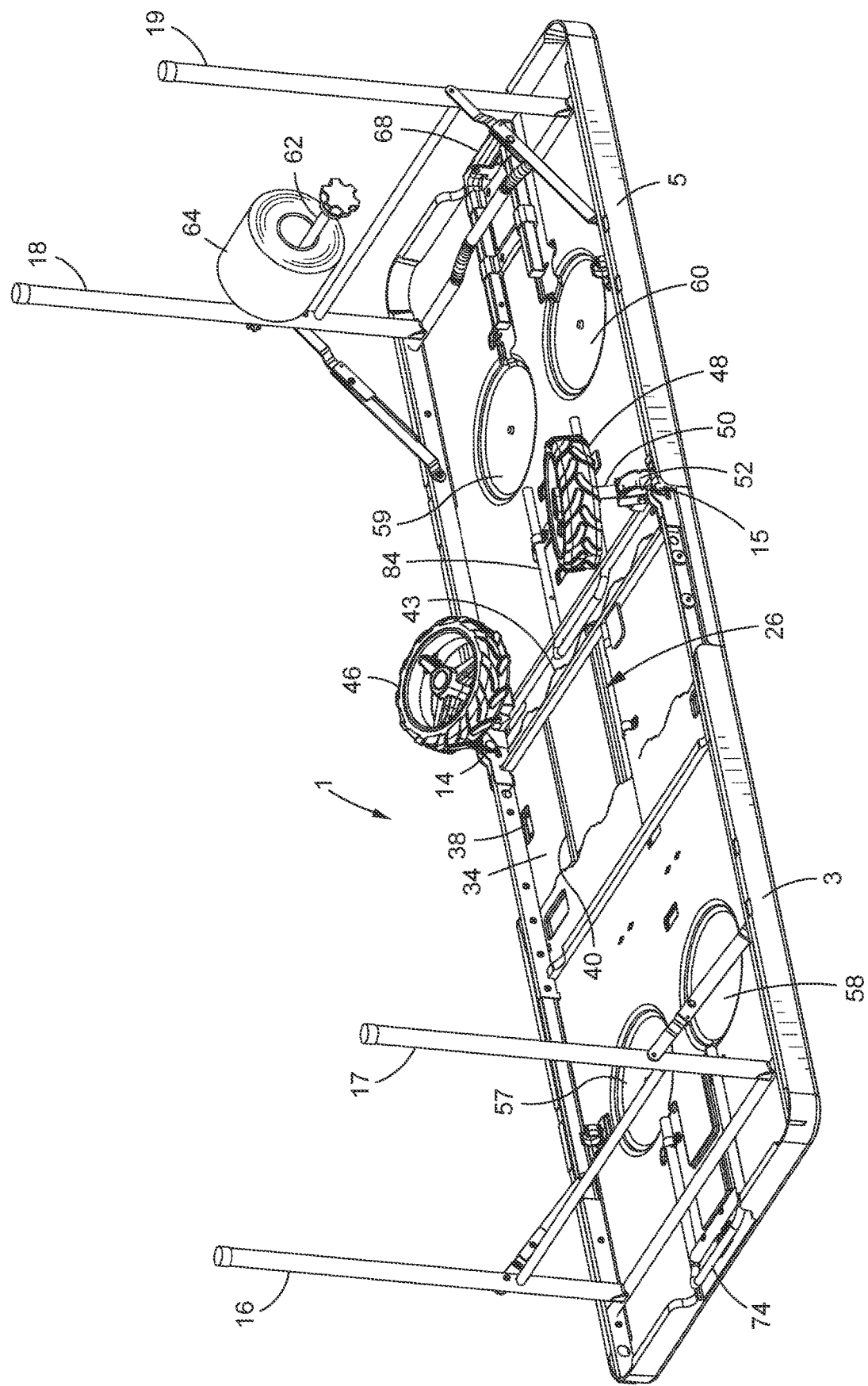
FIG. 7 shows the bottom of the folding table of FIG. 6 with the removable leaf rotated to the outstretched deployed position seated on the top of the pivot bar of the table frame so as to lie between the first and opposite table top surfaces.

As is best shown in FIGS. 4, 5 and 7, the outside ends of each side 32 and 34 of the removable leaf 26 and the adjacent inside ends of the table top surfaces 3 and 5 are provided with interlocking male and female tabs 43 and 44. When the removable leaf 26 has been rotated to its outstretched deployed position extending laterally across the table and the opposing table top surfaces 3 and 5 have been pushed together, the male and female tabs 43 and 44 engage one another so as to hold the leaf in place and prevent it from rotating downwardly under the influence of gravity from the deployed position to the stowed position.

Figure 11:
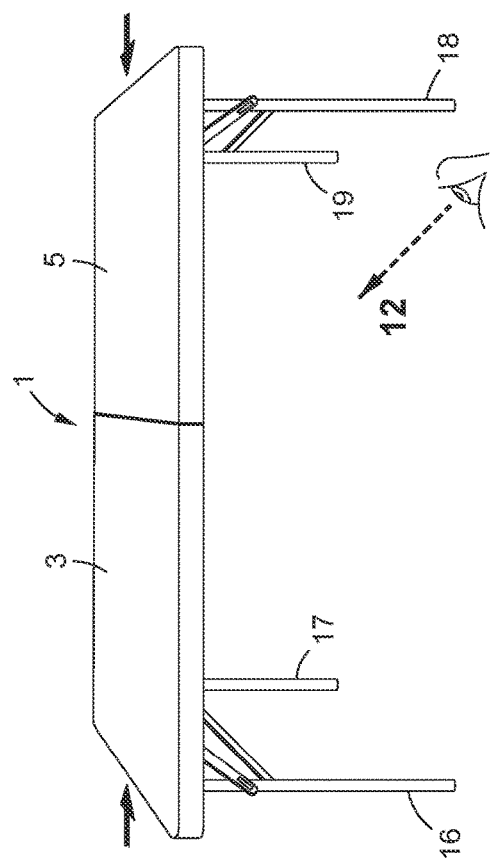
FIG. 11 illustrates a direction to view the bottom of the folding table and the spring-loaded table lock of FIG. 10.
Figure 12:
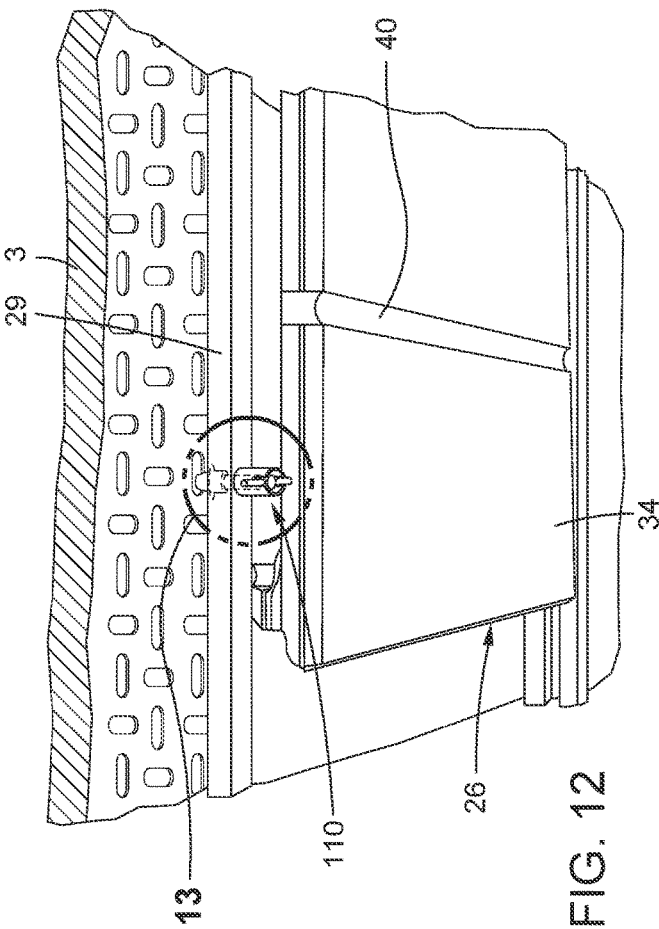
FIG. 12 shows the spring-loaded table lock of FIG. 10 connected to the table frame to lock the first and opposite table top surfaces end-to-end one another with the removable leaf rotated to the folded stowed position underneath the table.

Turning now to FIGS. 11-14 of the drawings, a spring-loaded table lock 110 is shown located below the first of the table top surfaces 3 of the folding table 1 at which to lock the opposing table top surfaces 3 and 5 end-to-end and one against the other as shown in FIG. 11 after the removable leaf 26 has first been rotated to its folded stowed position below table top surface 3. Looking up at the bottom of the table 1 in the direction indicated at FIG. 11, the table lock 110 is shown in FIG. 12 connected to one support 29 of the pair of pivot bar supports 29 and 30 between which the pivot bar support 28 extends as shown in FIG. 3.

Figure 14:
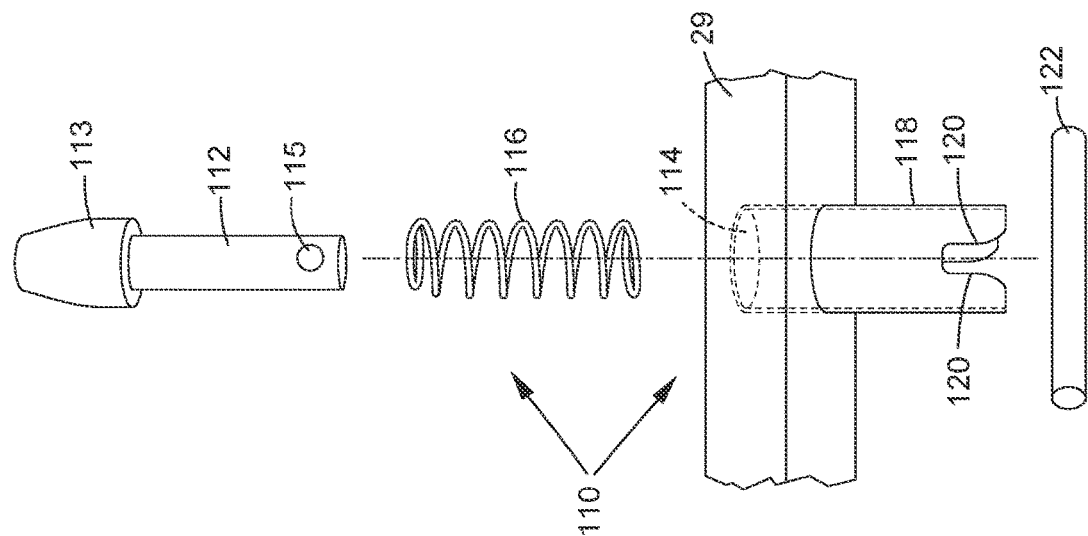
FIG. 14 is an exploded view of the spring-loaded table lock shown in FIG. 13.
Figure 13:
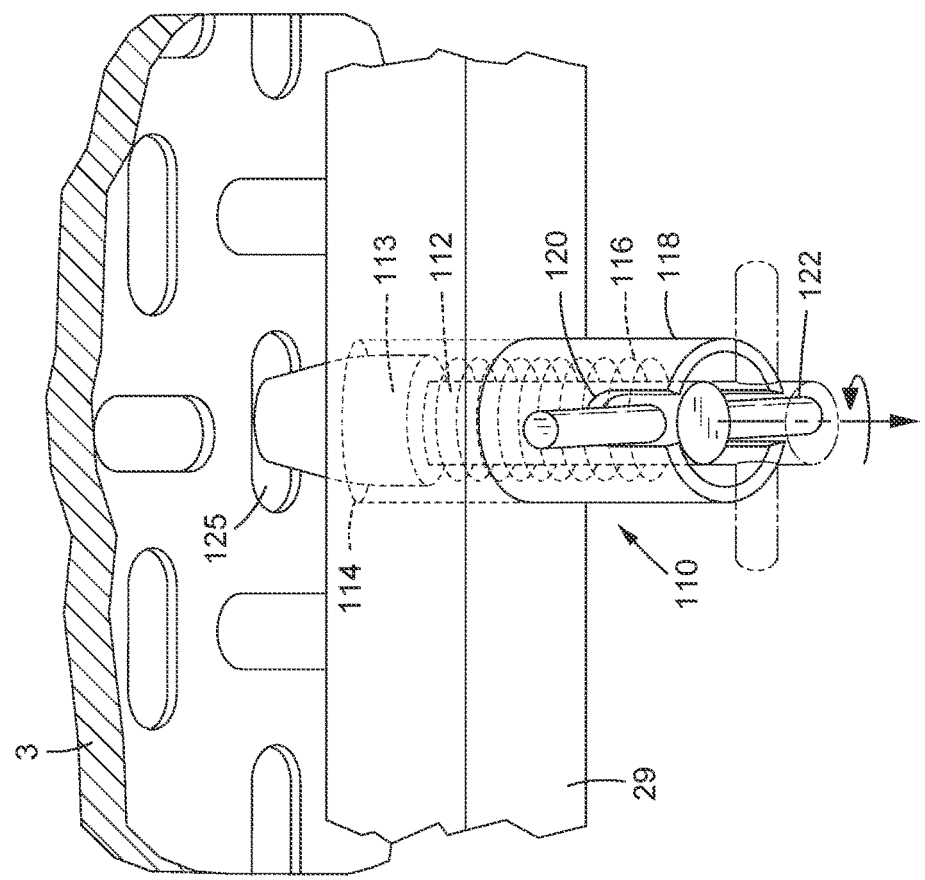
FIG. 13 is an enlarged detailed illustration of the spring-loaded table lock shown in FIG. 12 connected to the table frame while at rest.

As is best shown in FIGS. 13 and 14, the spring-loaded table lock 110 includes a stem 112 that is connected at the top thereof to a relatively wide head 113. The head 113 sits on top of a mounting hole 114 formed in the pivot bar support 29 to which the table lock 110 is connected when the stem 112 is pushed downwardly through mounting hole 114. The bottom of the stem 112 extends outwardly from and below the mounting hole 114 at the bottom of the pivot bar support 29. A coupling hole 115 is formed through the bottom of stem 112. A stiff coil spring 116 surrounds the stem 112 lying within the mounting hole 114 through the pivot bar support 29. A locking sleeve 118 is welded to the bottom of the pivot bar support 29 in axial alignment with the mounting hole 114, and a pair of downwardly facing locking grooves 120 are formed in the bottom of the sleeve 118 so as to lie opposite one another. A pull-pin 122 is pushed laterally through the coupling hole 115 at the bottom of the stem 112 and the pair of locking grooves 120 at the bottom of the locking sleeve 118. The top of the coil spring 116 that extends through the mounting hole 114 in the pivot bar support 29 is seated against the head 113 of stem 112. The bottom of the coil spring 116 that extends downwardly from the coupling hole 114 is surrounded by the locking sleeve 118 and seated against the bottom thereof.

When the table lock 110 is locked and at rest as shown in FIG. 13, the pull-pin 112 lies in the locking grooves 120 of the locking sleeve 118 and the coil spring 116 that is seated against the bottom of the locking sleeve 118 is expanded. The head 113 at the top of the stem 112 is pushed and held by the spring 116 outwardly from the mounting hole 114 and above the top of the pivot bar support 29 for receipt by a recess 125 that is molded into the bottom of the first table top surface 3. The recess 125 can be a single catch for the head 113 or one out of a group of honeycomb catches that run along the bottom of the table top surface 3. With the head 113 captured by recess 125, the first table top surface 3 below which the table lock 110 is mounted will be unable to slide away from the opposite table top surface 5 of FIG. 11. Thus, the opposing table top surfaces 3 and 5 will be locked end-to-end one another to prevent their sliding apart after the removable leaf 26 of FIGS. 4 and 9A has first been rotated around the pivot bar 28 to its folded stowed position lying below the table top surface 3.

When it is otherwise intended to open the table lock 110 in order to separate the table top surfaces 3 and 5 from one another to gain access to the leaf 26 for it to be rotated to its outstretched deployed position of FIGS. 6 and 9C, a downward pulling force is applied to the pull-pin 122 running through the coupling hole 115 at the bottom of stem 112. The pull-pin 122 is thusly pulled downwardly and outwardly from the locking grooves 120 of locking sleeve 118. The pull-pin 122 is then rotated around the bottom of the locking sleeve 118 as represented by the phantom lines in FIG. 13. At the same time, the head 113 is correspondingly pulled downwardly by the stem 112 into the mounting hole 114 in pivot bar support 29 and outwardly from the recess 125 formed in table top surface 3. The table lock 110 is now unlocked so as to permit the first table top surface 3 to slide away from the opposing table top surface 5. Likewise, the coil spring 116 is compressed against the bottom of the locking sleeve 118 by the head 113 of the downwardly moving stem 112. When the pulling force being applied to pull-pin 122 is terminated and the pull-pin is rotated around the locking sleeve 118 and back into receipt by the locking grooves 120, the spring 116 will once again expand so that the table lock 110 automatically returns to its at rest locked condition of FIG. 13.

As is best shown in FIGS. 3, 5 and 7, the folding table 1 is provided with a pair of pull-out wheels 46 and 48. Each of the wheels 46 and 48 has an axle 50 that is pivotally connected to a wheel brace 52. The wheel braces 52 are fixedly connected to the bottom of the table top surface 5 at each of the opposite sides thereof adjacent pivots 14 and 15. An outward pulling force applied to the wheels 46 and 48 against the bias of respective springs (not shown) causes the wheels to rotate with their axles 50 relative to wheel braces 52 between an inside location lying below the bottom of the table top surface 5 when the folding table 1 is in its unfolded extended configuration of FIG. 5 and an outside location lying outside and adjacent opposite sides of the table 1 prior to the table being rotated to its compact folded configuration of FIG. 16. Reference may be made to U.S. Pat. No. 9,738,295 issued Aug. 22, 2017 which is incorporated herein by reference for a detailed explanation of the features and operation of the pull-out wheels 46 and 48 of table 1.

Figure 10:
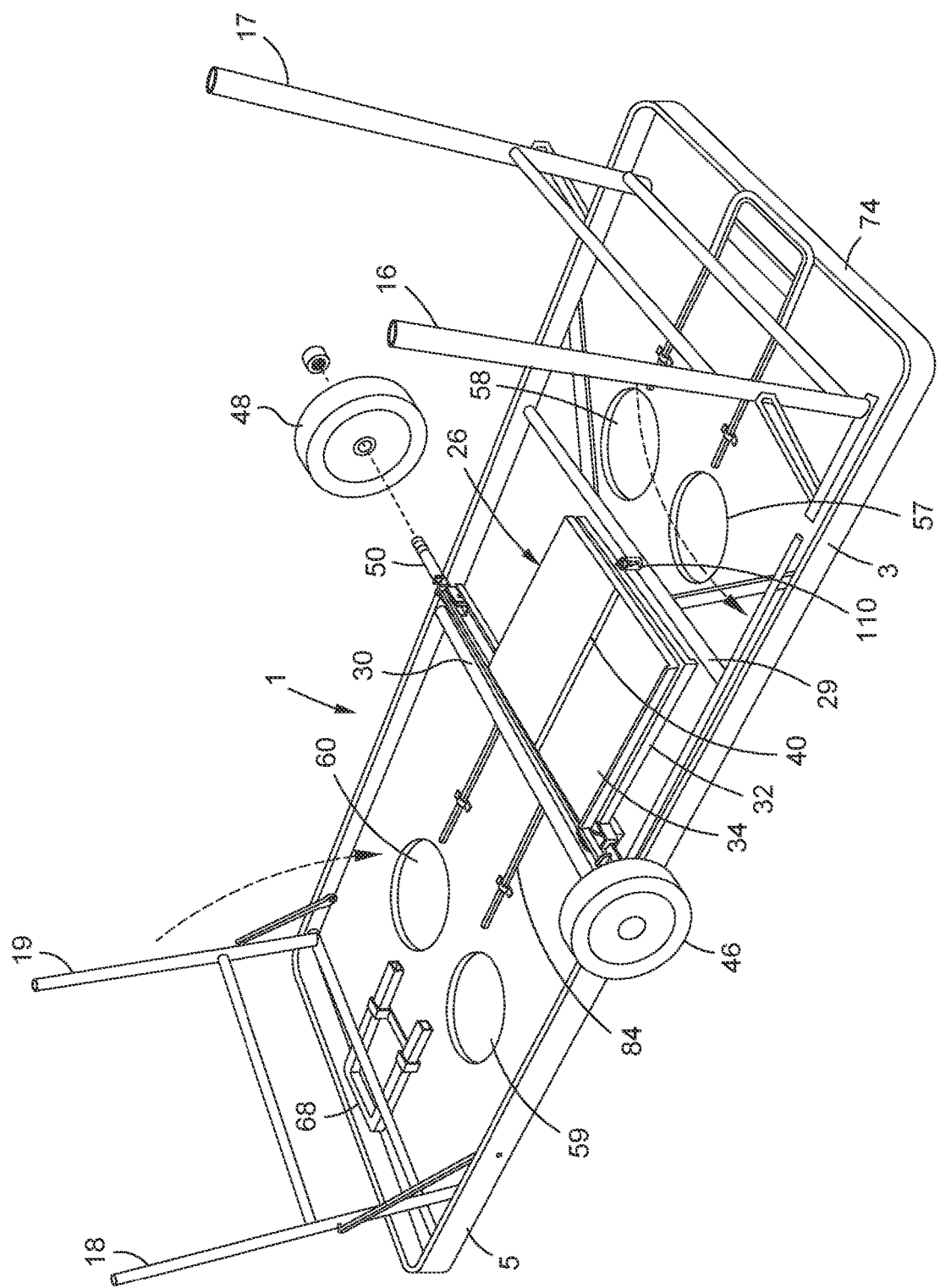
FIG. 10 shows the bottom of the folding table and a spring-loaded table lock connected to the table frame at which to lock the first and opposite table top surfaces end-to-end one another after the removable leaf has been rotated to the folded stowed position underneath the table.

A first pair of wheel pockets 57 and 58 are molded into the bottom of the first table top surface 3 of the folding table 1, and a second pair of wheel pockets 59 and 60 are molded into the bottom of the opposing table top surface 5. To facilitate the shipment of the folding table 1 to a user, the pair of wheels 46 and 48 are disassembled from their axles 50 as illustrated in FIG. 10. To advantageously reduce its profile and the space consumed by the table within a shipping container and correspondingly reduce the shipping cost, the wheels 46 and 48 are stored within the wheel pockets 57-60 molded into the table top surfaces 3 and 5.

Prior to the table 1 being packaged for shipment, the first and second pairs of upstanding legs 16, 17 and 18, 19 are rotated downwardly at brackets 20 so as to lie adjacent the bottoms of table top surfaces 3 and 5. The folding table 1 is then rotated at the first and second pivots 14 and 15 to its folded configuration such that the table top surfaces 3 and 5 lie face-to-face one another. As is best shown in FIGS. 10 and 15, after table top surface 5 is rotated to face its adjacent table top surface 3, one of the wheels 46 is received between and surrounded by the wheel pockets 57 and 59, and the other wheel 48 is received between and surrounded by the wheel pockets 58 and 60. Accordingly, the wheels 46 and 48 will be held in place and carried below the table top surfaces 3 and 5 to enable a smaller shipping container to be utilized.

As is best shown in FIGS. 3 and 6, the folding table 1 has an optional paper towel holder by which a roll of paper towels 64 is made conveniently accessible to an individual. The paper towel holder is preferably a mounting rod 62 that is removably attached to and extends inwardly from one of the table legs (e.g., 18). The mounting rod 62 is sized to be received through the center of the roll of paper towels 64. The roll 64 is rotated around the mounting rod 62 in response to a pulling force that is generated when the individual removes one or more sheets of paper towels from the roll thereof. A screw-off end cap 66 is attached to the outside end of the mounting rod 62 by which to prevent the roll of paper towels 64 from accidentally sliding of the rod.

As is best shown in FIGS. 3 and 5, a U-shaped pull-out table transport handle 68 of the folding table 1 is received within a first handle pocket 70 that is molded into the bottom of the table top surface 5 at the outside end thereof. The table transport handle 68 is surrounded by and attached to the bottom of table top surface 5 by pairs of sleeves 71 and 72. The handle 68 is slidable back and forth through the sleeves 71 and 72 and along pocket 70 between an out of the way retracted position lying entirely below table top surface 5 and an axially extended position projecting outwardly from the outside end of table top surface 5.

When the folding table 1 is stationary in its unfolded extended configuration such that the first and opposite table top surfaces 3 and 5 lie end-to-end, the table transport handle 68 is pushed inwardly below the table top surface 5 so as to lie out of the way in its retracted position entirely within the handle pocket 70 (best shown in FIG. 5). However, when the table 1 is in its compact folded configuration of FIG. 16 to be transported from one place to another by rolling on its wheels 46 and 48, a pulling force applied to the table transport handle 68 causes the handle to move through the pairs of sleeves 71 and 72 to its axially extended position. In this case, the handle 68 slides through the handle pocket 70 so as to extend outwardly from the table top surface 5. As is best shown in FIGS. 16 and 17, when the folding table 1 has been rotated to its folded configuration and the table top surfaces 3 and 5 lie face-to-face, the outwardly extending pull-out table transport handle 68 is ideally located so as to be conveniently grasped and pulled in the hand of a single individual for relocating the table 1 from place to place by rolling on wheels 46 and 48.

As is also best shown in FIGS. 3 and 5, a U-shaped pull-out chair rack 74 of the folding table 1 is received within a second handle pocket 76 that is molded into the bottom of the table top surface 3. The handle pocket 76 lies at the opposite end of the table below which the handle pocket 70 is located and at which the pull-out table transport handle 68 is slidably received. The chair rack 74 is surrounded by and attached to the bottom of the table top surface 3 by a pair of clips 78. The chair rack 74 is slidable back and forth through the clips 78 and along pocket 76 between an out of the way retracted position lying entirely below the table top surface 3 and an axially extended position projecting outwardly from the outside end of table top surface 3.

As in the case of the table transport handle 68 that is carried by the table top surface 5, when the folding table is stationary in its unfolded extended configuration such that the first and opposite table top surfaces 3 and 5 lie end-to-end, the pull-out chair rack 74 is pushed inwardly below the table top surface 3 so as to lie in its retracted position entirely within the handle pocket 76 (best shown in FIG. 5). However, when the table 1 is in its compact folded configuration of FIG. 16 to be transported from one place to another by pulling the table transport handle 68, a pulling force applied to the pull-out chair rack 74 causes the chair rack to move through the clips 78 to its axially extended position. In this case, the chair rack 74 slides through the handle pocket 76 of FIG. 3 so as to extend outwardly from the table top surface 3.

As is best shown in FIG. 16, when the folding table 1 has been rotated to its compact folded configuration and the first and opposite table top surfaces 3 and 5 lie face-to-face, the pull-out chair rack 74 is rotated at joints 75 from a vertical orientation lying in parallel alignment with the pull-out table transport handle 68 to a horizontal orientation lying in perpendicular alignment with handle 68. After first being pulled outwardly from the outside end of the table top surface 3 to its axially extended position and then being rotated at joints 75 relative to the table transport handle 68, the chair rack 74 is ideally oriented to be moved into engagement with and transport articles such as, for example, a stack of conventional folding chairs 80 that lie flat one on top of the other against the table top surface 3.

FIGS. 3 and 5 also show a pull-out cooler transport rack 84 of the folding table 1 attached to the bottom of the table top surface 5 at which to be surrounded by a pair of clips 86. The cooler transport rack 84 has particular application for transporting a cooler (designated 88 in FIG. 16) in which food and beverages are typically stored for consumption at a picnic. As best shown in FIG. 8, the cooler transport rack 84 runs through a cross bar 87 that extends laterally across the wagon frame 7 between the side rails 10 and 11. The cooler transport rack 84 is slidable in response to a pulling force applied thereto through the clips 86 and the cross bar 87 between an out of the way retracted position lying below the table top surface 5 and an axially extended position projecting outwardly from the inside end of table top surface 5 that lies opposite the outside end of the table top surface 5 from which the pull-out table transport handle 68 is located. In its axially extended position, the pull-out cooler transport rack 84 can be bent as shown in FIG. 18 to create a U-shaped stand 96 on which a cooler 88 is seated and transported with the wagon.

Figure 18:
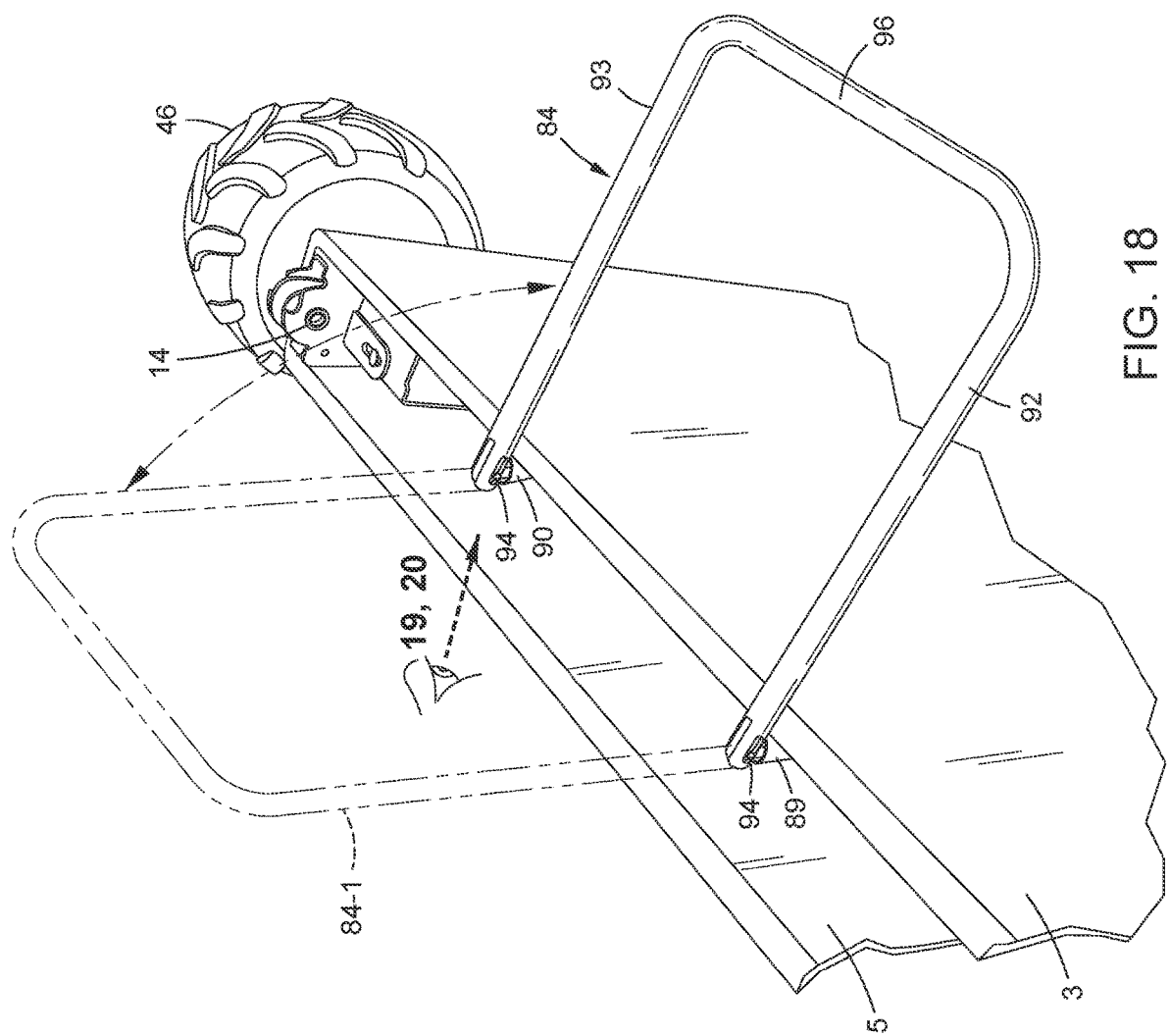
FIGS. 18-20 show details of the cooler transport rack of FIG. 16 adapted to be rotated at a pair of pivot pins from an axially extended position to a perpendicular cooler transport position to form a stand on which to transport a cooler.
Figure 20:
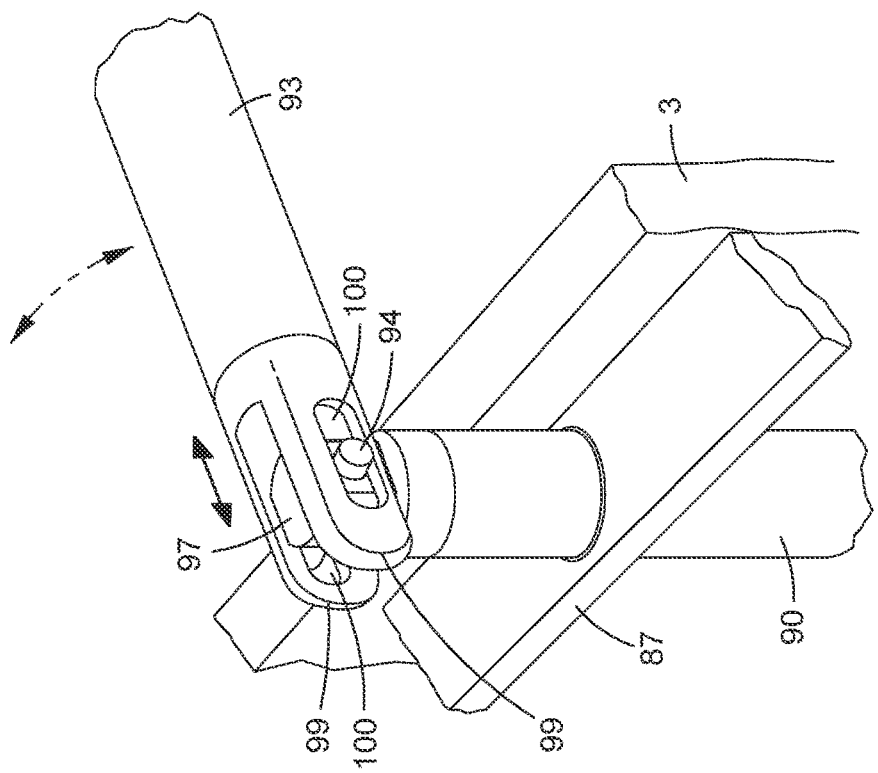
Figure 19:
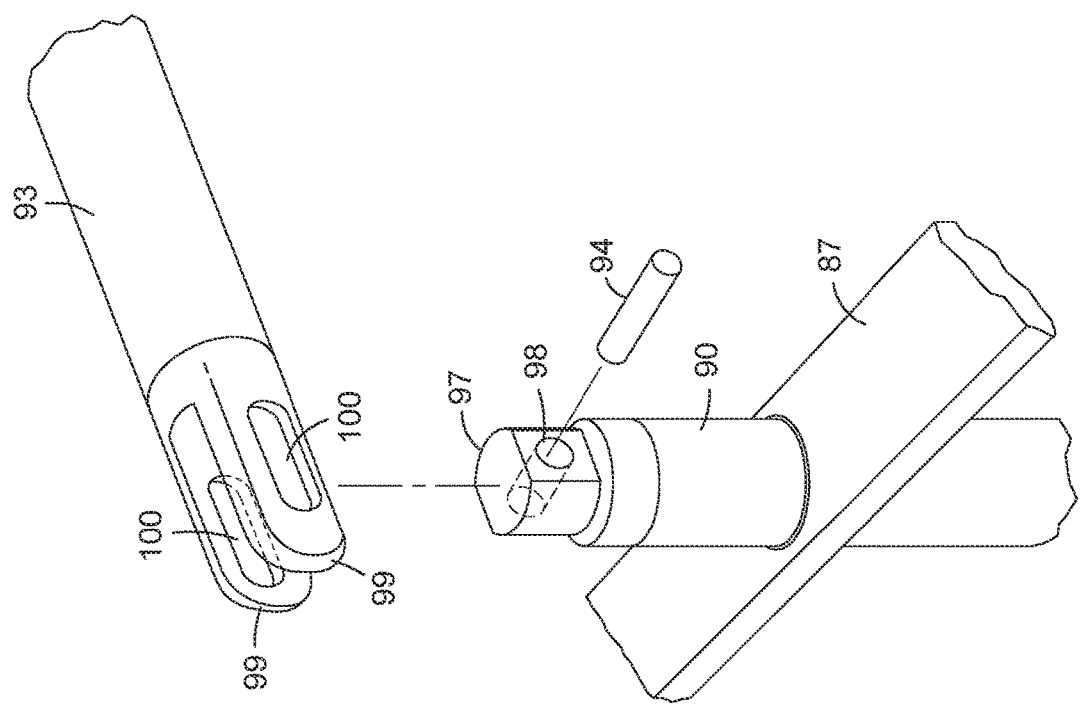

Referring in this regard to FIGS. 18-20 of the drawings, FIG. 18 shows the cooler transport rack 84 after the folding table 1 has been folded and the rack has been pulled outwardly to its axially extended position (shown in broken lines and designated by reference numeral 84-1) from the inside end of the table top surface 5 shown in FIGS. 5 and 7. The cooler transport rack 84 has a pair of inner legs 89 and 90 that are pivotally coupled to a pair of outer legs 92 and 93 (best shown in FIGS. 19 and 20) by a corresponding pair of pivot pins 94. The pair of outer legs 92 and 93 turn towards one another and are joined together to create a U-shaped stand 96 on which the aforementioned cooler 88 is carried.

As is also best shown in FIG. 18, the pair of outer legs 92 and 93 and the U-shaped stand 96 formed thereby are rotatable at the pivot pins 94 through an angle of about 90 degrees from the axially extended position of the cooler transport rack 84 to a cooler transport position of rack 84 at which the pair of outer legs 92 and 93 and the stand 96 running therebetween lie in perpendicular alignment with the pair of inner legs 89 and 90 to which the pair of outer legs are coupled. As is best shown in FIGS. 19 and 20, each inner leg (e.g., 90) has a coupling head 97 located at the top thereof and a coupling hole 98 formed therethrough. The adjacent end of each outer leg (e.g., 93) that lies opposite the U-shaped stand 96 has a pair of spaced and parallel aligned coupling fingers 99 projecting therefrom. An elongated slot 100 is formed in each of the coupling fingers 99. The coupling head 97 at the top of the inner leg 90 is received in the space between the pair of coupling fingers 99 that project from the outer leg 93. Accordingly, the elongated slots 100 in coupling fingers 99 are axially aligned with the coupling hole 98 formed in the coupling head 97 of the inner leg 90 to receive pivot pin 94 therethrough. By virtue of the foregoing, the adjacent ends of the inner and outer legs 90 and 93 of the cooler transport rack 84 are pivotally coupled one to the other.

With the cooler transport rack 84-1 initially in its axially extended position as shown in FIG. 18, a pulling force is applied to the pair of outer legs 92 and 93 by which to move the outer legs and the U-shaped stand 96 away from the coupling heads 97 at the top of the inner legs 89 and 90. The pivot pins 94 are thusly caused to slide in a first direction through the coupling slots 100 formed in the coupling fingers 99 of the outer legs 92 and 93. The pair of outer legs 92 and 93 can now be rotated around the pair of pivot pins 94 until the outer legs 92 and 93 lie in perpendicular alignment with the inner legs 89 and 90. The cooler transport rack 84 is now in its cooler transport position of FIG. 18 at which the cooler 88 can be seated on the U-shaped stand 96.

When the pair of outer legs 92 and 93 are pushed towards the coupling heads 97 at the top of each of the pair of inner legs 89 and 90, the pivot pins 94 will slide in an opposite direction through the elongated slots 100 formed in the coupling fingers 99. The cooler transport rack 84 will now be locked in its cooler transport position at which to receive and transport the cooler 88 on the U-shaped stand 96 in the manner shown in FIG. 16.

The invention claimed is:

1. A folding table having a length and comprising:
a frame including first and opposite frame ends that are pivotally connected together and rotatable relative to one another between a folded configuration at which to lie facing one another and an unfolded configuration at which to lie end-to-end one another, said first frame end having at least one rail extending therealong;
a first table top surface mounted on the at least one rail of said first frame end and an opposite table top surface mounted on said opposite frame end such that said first and opposite table top surfaces rotate with said first and opposite frame ends when said first and opposite frame ends rotate between said folded configuration and said unfolded configuration,
the first table top surface being movable along the at least one rail of said first frame end towards and away from the opposite table top surface mounted on said opposite frame end; and
a table leaf located on said frame to lie between and in end-to-end alignment with said first and opposite table top surfaces when said first and opposite frame ends are rotated to said unfolded configuration and said first table top surface is moved on said at least one rail away from the opposite table top surface whereby to increase the length of said table,
said table leaf being removed from between said end-to-end alignment with said first and opposite table top surfaces so that said first table top surface can be moved on said at least one rail towards the opposite table top surface whereby to shorten the length of said table.

2. The folding table recited in claim 1, wherein said table leaf is connected to said frame.

3. The folding table recited in claim 1, wherein said table leaf is pivotally coupled to said frame so as to be rotatable relative to said frame between a deployed position lying between and in said end-to-end alignment with said first and opposite table top surfaces after said first and opposite frame ends have been rotated to said unfolded configuration and said first table top surface has been moved away from said opposite table top surface and a stowed position located below said first table top surface when said table leaf is removed from said end-to-end alignment with said first and opposite table top surfaces and said first table top surface is moved towards said opposite table top surface.

4. The folding table recited in claim 3, wherein said frame also includes a pivot bar to which said table leaf is pivotally coupled so as to be rotatable around said pivot bar relative to said frame between said deployed and stowed positions.

5. The folding table recited in claim 4, wherein said table leaf is located above said pivot bar to lie between and in said end-to-end alignment with said first and opposite table top surfaces when said table leaf is rotated to said deployed position, and said table leaf is located below said pivot bar and out of said end-to-end alignment with said first and opposite table top surfaces so as to lie below the first table too surface when said table leaf is rotated to said stowed position.

6. The folding table recited in claim 5, wherein said table leaf lays on top of said pivot bar when said table leaf is rotated to said deployed position, and said table leaf is suspended from said pivot bar to lie underneath said pivot bar when said table leaf is rotated to said stowed position.

7. The folding table recited in claim 5, wherein said table leaf has first and opposite sides that are pivotally connected to one another at a spine, said first and opposite sides being rotatable at said spine to an outstretched configuration at which said first and opposite sides lie side-by-side one another when said table leaf is rotated around said pivot bar to said deployed position above said pivot bar, and said first and opposite sides being rotatable at said spine to a folded configuration at which said first and opposite sides lie one above the other when said table leaf is rotated around said pivot bar to said stowed position below said pivot bar.

8. The folding table recited in claim 7, further comprising a bracket connected to the first frame end of said folding table below the first table top surface at which to receive thereupon and support said table leaf after said table leaf is rotated in said folded configuration around said pivot bar to said stowed position below said pivot bar.

9. The folding table recited in claim 5, wherein said table leaf has first and opposite ends and a set of tabs running along each of said first and opposite ends and adapted to engage respective adjacent ends of said first and opposite table top surfaces when said table leaf is rotated to said deployed configuration at which to lie between and in said end-to-end alignment with said first and opposite table top surfaces.

10. The folding table recited in claim 1, wherein each of the first and opposite frame ends of said frame has a pair of folding legs adapted to be rotated between a first location extending downwardly from said first and opposite frame ends by which to hold said folding table up when said first and opposite frame ends are rotated to said unfolded configuration and a second location facing said first and opposite frame ends when said first and opposite frame ends are rotated to said folded configuration, one of said folding legs from one of said pairs of folding legs having a paper towel roll holder connected thereto.

11. The folding table recited in claim 10, wherein said paper towel holder is a rod extending outwardly from the one of said folding legs and being sized to be surrounded by a roll of paper towels.

12. The folding table recited in claim 11, further comprising an end cap removably attached to the outwardly extending rod of said paper towel holder to prevent a removal of a roll of paper towels surrounding said rod.

13. The folding table recited in claim 1, further comprising a pair of wheels coupled to said folding table below one of said first or opposite table top surfaces and adapted to be repositioned from an inside location lying underneath the one of said table top surfaces when the first and opposite frame ends of said frame are rotated to said unfolded configuration and an outside location lying outside the one of said table top surfaces prior to said first and opposite frame ends being rotated from said unfolded configuration to said folded configuration so that said rolling table is transported from one place to another by rolling on said pair of wheels after said first and opposite frame ends are rotated to said folded configuration.

14. The folding table recited in claim 13, wherein said pair of wheels are detachable from said folding table, at least one of said first or second table top surfaces having a pair of wheel pockets formed therein within which to receive and carry respective ones of said pair of wheels when said pair of wheels are detached from said folding table and said first and opposite frame ends are rotated to said folded configuration.

15. The folding table recited in claim 13, wherein each of the first and opposite table top surfaces has a first end and an opposite end, said folding table further comprising a pull-out table transport handle mounted underneath a first of said first and opposite table top surfaces and being responsive to a first pulling force applied thereto so as to slide outwardly from the first end of said first table top surface at which to be grasped and pulled so that said folding table is transported by rolling on said pair of wheels after said pair of wheels are repositioned to said outside location and the first and opposite frame ends of said frame are rotated to said folded configuration.

16. The folding table recited in claim 15, further comprising a pull-out cooler transport rack lying below said first table top surface and being responsive to a second pulling force applied thereto so as to slide outwardly from the opposite end of said first table top surface at which to transport a cooler seated on said cooler transport track after said pair of wheels are repositioned to said outside location and the first and opposite frame ends of said frame are rotated to said folded configuration at which said folding table is transported by rolling on said pair of wheels.

17. The folding table recited in claim 16, wherein said pull-out cooler transport rack has a first end mounted underneath said first table top surface so as to be slidable along and outwardly from the opposite end thereof in response to said second pulling force and a second end pivotally coupled to said first end and rotatable between a first position lying in end-to-end axial alignment with said first end and a second position lying in perpendicular alignment with said first end to create a stand on which to transport the cooler.

18. The folding table recited in claim 17, wherein the second end of said pull-out cooler transport rack is pivotally coupled to the first end of said pull-out cooler transport rack by a pivot pin extending through each of said first and second ends.

19. The folding table recited in claim 15, further comprising a pull-out chair rack mounted underneath the opposite one of said first and opposite table top surfaces and being responsive to a second pulling force applied thereto so as to slide outwardly from said opposite table top surface at which to engage and transport at least one folding chair laying flat on said opposite table top surface after said pair of pull-out wheels are rotated to said outside location and the first and opposite frame ends of said frame are rotated to said folded configuration at which said folding table is transported by rolling on said pair of pull-out wheels.

20. The folding table recited in claim 1, further comprising a table lock connected to said first frame end below said first table top surface at which to engage said first table top surface and thereby prevent said first table top surface from moving relative to said opposite table top surface.

21. The folding table recited in claim 20, wherein said table lock includes a spring-actuated locking head and a spring that communicates with said spring-actuated locking head, said spring being expanded to urge said locking head to move into engagement with said first table top surface and thereby prevent said first table top surface from moving relating to said opposite table top surface.

22. The folding table recited in claim 21, wherein said first table top surface has a recess formed therein within which to receive and capture the spring-actuated locking head of said table lock when said locking head moves into said engagement with said first table top surface to thereby prevent said first table top surface from moving relative to said opposite table top surface.

23. The folding table recited in claim 21, wherein said table lock also includes a locking stem having a first end at which said spring-actuated locking head is located and an opposite end surrounded by said spring, said locking stem being responsive to a pulling force applied thereto by which to cause said spring to be compressed and said spring-actuated locking head to be correspondingly pulled out of said engagement with said first table top surface to thereby permit said first table top surface to move relative to said opposite table top surface.

24. The folding table recited in claim 23, wherein said table lock also includes a pull-pin extending laterally through the opposite end of said locking stem at which to receive said pulling force to be transferred from said pull-pin and applied to said locking stem by which to cause said spring to be compressed and said spring-actuated locking head to be pulled out of said engagement with said first table top surface to thereby permit said first table top surface to move relative to said opposite table top surface.

25. A folding table comprising:
at least one rail;
a first table end mounted on said at least one rail;
an opposite table end pivotally connected to said first table end such that said first and opposite table ends are rotatable relative to one another between a folded configuration at which to lie facing one another and an unfolded configuration at which to lie end-to-end one another such that said folding table has a length,
said first table end also being movable along said at least one rail towards and away from said opposite table end; and
a removable table leaf being located at a first position lying between and in end-to-end alignment with said first and opposite table ends after said first and opposite table ends are rotated to said unfolded configuration and said first table end is moved away from said opposite table end whereby to increase the length of said folding table,
said removable table leaf being relocated to a second position out of said end-to-end alignment with and between said first and opposite table ends so as to lie below one of said first or opposite table ends such that said first table end can be moved towards and into end-to-end alignment with said opposite table end whereby to decrease the length of said folding table.

* * * * *